(12) United States Patent
Chen et al.

(10) Patent No.: US 12,375,868 B2
(45) Date of Patent: Jul. 29, 2025

(54) CONTROL METHOD AND SYSTEM USING THE SAME

(71) Applicant: SHENZHEN CYWEEMOTION TECHNOLOGY CO., LTD., Shenzhen (CN)

(72) Inventors: Yu-Chun Chen, Shenzhen (CN); Huan Chang, Shenzhen (CN); Shun-Nan Liou, Shenzhen (CN)

(73) Assignee: SHENZHEN CYWEEMOTION TECHNOLOGY CO., LTD., Shenzhen (CN)

( * ) Notice: Subject to any disclaimer, the term of this patent is extended or adjusted under 35 U.S.C. 154(b) by 197 days.

(21) Appl. No.: 18/468,762

(22) Filed: Sep. 18, 2023

(65) Prior Publication Data
US 2024/0305948 A1    Sep. 12, 2024

(30) Foreign Application Priority Data
Mar. 7, 2023    (CN) .................. 202310210230.X (51) Int. Cl.
*H04S 7/00*      (2006.01)
*H04R 1/10*      (2006.01)
*H04R 5/033*     (2006.01)

(52) U.S. Cl.
CPC .......... *H04S 7/304* (2013.01); *H04R 1/1041* (2013.01); *H04R 5/033* (2013.01); *H04S 2400/11* (2013.01)

(58) Field of Classification Search
None
See application file for complete search history.

(56) References Cited

U.S. PATENT DOCUMENTS

| | | | |
|---|---|---|---|
| 8,041,659 B2 * | 10/2011 | Tu .......................... | G06F 3/038 706/14 |
| 9,050,528 B2 * | 6/2015 | Kawano ................. | G06V 40/20 |
| 10,222,875 B2 * | 3/2019 | Sakaguchi ............ | G06F 3/0346 |
| 11,950,040 B2 * | 4/2024 | Miller ..................... | G06F 3/165 |
| 2021/0397249 A1 | 12/2021 | Kriminger et al. | |
| 2021/0397250 A1 | 12/2021 | Akgul et al. | |
| 2021/0400418 A1 | 12/2021 | Tam et al. | |
| 2021/0400419 A1 | 12/2021 | Turgut et al. | |
| 2022/0026519 A1 * | 1/2022 | Wu ........................ | G01S 7/006 |
| 2022/0103964 A1 | 3/2022 | Tu et al. | |
| 2022/0103965 A1 | 3/2022 | Tu et al. | |

* cited by examiner

*Primary Examiner* — Paul W Huber
(74) *Attorney, Agent, or Firm* — McClure, Qualey & Rodack, LLP (57) ABSTRACT

A control method is provided. The method is used in a system and executed by a processor of the system. The method includes storing motion sensor measurements produced before a movement event is identified, wherein the motion sensor measurements is produced by motion sensors. The method includes marking the motion sensor measurements lower than a sensitivity threshold as valid when the motion sensor measurements match a change trend. The method includes generating orientation data based on the valid motion sensor measurements.

26 Claims, 9 Drawing Sheets

FIG. 10

CONTROL METHOD AND SYSTEM USING THE SAME

CROSS REFERENCE TO RELATED APPLICATIONS

This application claims priority from China Patent Application No. 202310210230.X, filed on Mar. 7, 2023, the disclosure of which is incorporated herein in their entirety by reference.

BACKGROUND OF THE INVENTION

Field of the Invention

The present disclosure generally relates to the field of spatial audio technologies. More specifically, aspects of the present disclosure relate to a control method and a system using the same.

Description of the Related Art

Wearable apparatuses are widely used. Such wearable apparatuses as TWS (True Wireless Stereo) headsets, earphones and AR/VR glasses can be used to play spatial audio, enabling users to obtain an immersive stereophonic effect. However, these wearable apparatuses have a relatively short battery life and cannot meet the user's long-term entertainment needs.

Therefore, there is a need for a control method and a system using the same to solve this problem.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a control method and system using the same to improve the battery life for the system.

In an exemplary embodiment, a system is provided. The system includes motion sensors and a processor. The motion sensors produce motion sensor measurements in a stream. The processor is coupled to the motion sensors and configured to execute the following tasks: storing the motion sensor measurements produced before a movement event is identified; marking the motion sensor measurements lower than a sensitivity threshold as valid when the motion sensor measurements match a change trend; and generating orientation data based on the valid motion sensor measurements.

In some embodiments, the processor is embedded with a buffer, and further executes the following tasks: storing the motion sensor measurements produced over a time window before the movement event is identified in the buffer; identifying a turning event in the change trend, wherein the change trend is classified as one of a trembling phase for the motion sensor measurements not matching a consistent change trend and an acceleration phase for the motion sensor measurements matching the consistent change trend; and marking the motion sensor measurements corresponding to the acceleration phase as valid and the motion sensor measurements corresponding to the trembling phase as invalid; wherein the invalid motion sensor measurements before the movement event are set to zero.

In some embodiments, the processor further executes the following tasks: determining that the motion sensor measurements belong to the acceleration phase for the motion sensor measurements matching the consistent change trend; and determining that the motion sensor measurements belong to the trembling phase for the motion sensor measurements not matching the consistent change trend.

In some embodiments, the motion sensor measurements produced before the movement event is stored over a prolonged time window, which is at least 2 times larger than the time window, and the processor is configured to identify the movement event when a value of the motion sensor measurements over the prolonged time window exceeds the sensitivity threshold.

In some embodiments, each of the motion sensor measurements has a time stamp corresponding to the time at which the motion sensor measurement is produced, and wherein the step of generating the orientation data further comprises: estimating the orientation data of the system, wherein each of the orientation data has a time stamp corresponding to the time at which the orientation data are estimated; withholding the value of the orientation data until the movement event is identified; and consecutively updating the value of the orientation data based on the valid motion sensor measurements, wherein the valid motion sensor measurements have earlier time stamps than time stamps of the estimated orientation data.

In some embodiments, wherein the difference between the time stamps of the valid motion sensor measurements and the time stamps of the motion sensor measurements is corresponding to a time span of the time window.

In some embodiments, the step of consecutively updating the value of the orientation data based on the valid motion sensor measurements further comprises: performing an integration operation with an extended Kalman filter on the valid motion sensor measurements with the earlier time stamps to estimate the orientation data with current time stamps.

In some embodiments, the motion sensor measurements comprise a horizontal axis rotation value of rotation measurement data in the motion sensor measurements.

In some embodiments, the processor further executes the following tasks: filtering out down-sample sensor measurements from the motion sensor measurements with a down-sample output data rate (ODR) in response to a low activity state is identified based on the motion sensor measurements; performing an integration operation with an extended Kalman filter on the down-sample sensor measurements to generate down-sample orientation data with the down-sample ODR; generating interpolation orientation data by performing an interpolation with the down-sample ODR according to the down-sample orientation data; generating the full-ODR orientation data according to the down-sample orientation data and the interpolation orientation data; and playing spatial audio according to the full-ODR orientation data.

In some embodiments, the processor further executes the following tasks: performing an operation with the extended Kalman filter on the motion sensor measurements to generate full-ODR orientation data in response to the system not being in a low activity state; and playing spatial audio according to the full-ODR orientation data.

In some embodiments, the motion sensors are attached to a headset worn by a user, and the headset is a binaural audio device including two earpieces, each earpiece has an auxiliary sensor and a micro-processor of generating the orientation data, and each micro-processor further executes the following tasks: in response to one of the two earpieces switching from an operation mode to a standby mode, the other earpiece switches from the standby mode to the operation mode.

In some embodiments, the one of the two earpieces transmits the orientation data corresponding to a switch time stamp to the other earpiece, and switches from the operation mode to the standby mode, while the other one of the two earpieces continues to generate the orientation data based on the transmitted orientation data and the motion sensor measurements from the motion sensors of the other one of the two earpieces.

In some embodiments, wherein the motion sensor measurements matching the consistent change trend if a majority of comparison results between each pair of consecutive motion sensor measurements over the time window is consistent.

In an exemplary embodiment, a control method is provided. The control method is used in a system and executed by a processor of the system, comprising: storing motion sensor measurements produced before a movement event is identified, wherein the motion sensor measurements is produced by motion sensors; marking the motion sensor measurements lower than a sensitivity threshold as valid when the motion sensor measurements match a change trend; and generating orientation data based on the valid motion sensor measurements.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

In the disclosure, unless specified or limited otherwise, relative terms such as "central", "longitudinal", "transversal", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
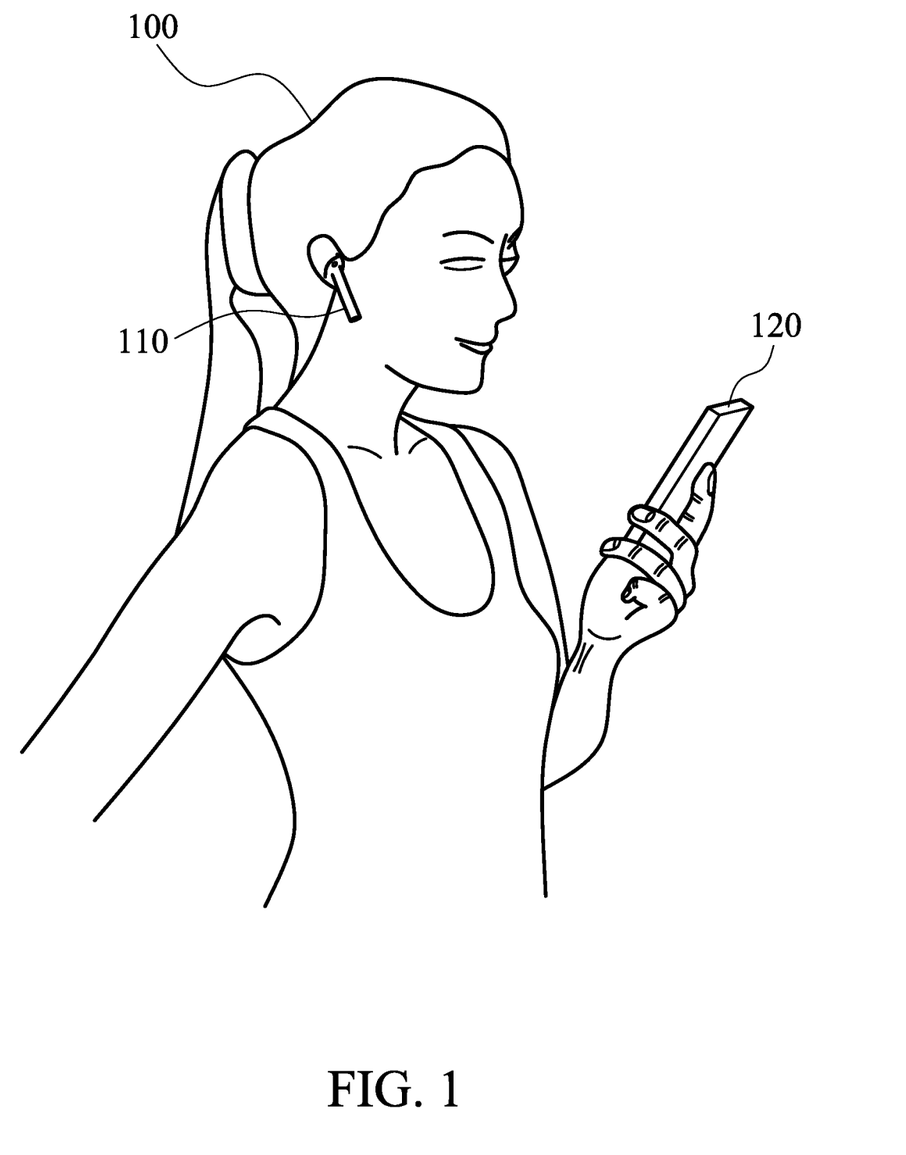
FIG. 1 illustrates a schematic diagram of playing spatial audio according to an embodiment of the disclosure.

FIG. 1 illustrates a schematic diagram of playing spatial audio according to an embodiment of the disclosure. In the example scenario shown, the user 100 is wearing a wearable electronic device 110 while watching audio/visual (A/V) content on a source device 120. The wearable electronic device 110 can be a headset that is wirelessly coupled to the source device 120. The headset includes stereo loudspeakers that output rendered spatial audio (e.g., binaural rendered audio) content generated by the source device 120. The A/V content can include but is not limited to: movies, television shown, conference calls, video game, augmented reality (AR) applications, virtual reality (VR) applications and any other content that utilizes spatial or immersive audio. The wearable electronic device 110 includes any type of audio output device that is worn by the user, including on-ear, in-ear and over-ear headphones, earbuds, earphones, Bluetooth headphones, VR or AR headsets and any other audio output device that is capable of producing spatial audio to enable the user 100 to get immersive stereophonic effects. When the user 100 moves, the wearable electronic device 110 moves and updates the orientation information of the spatial audio accordingly, so that the stereophonic sound can be accurately positioned in a suitable direction.

The source device 120 is any device capable of presenting any type of A/V content or only spatial audio content, including but not limited to: a smartphone, tablet computer, notebook computer, wearable computer, table computer, surface tablet, etc. A spatial audio may be an application that runs on the source device 120 and generates stereophonic sound or 3D audio through the wearable electronic device 110.

Figure 2:
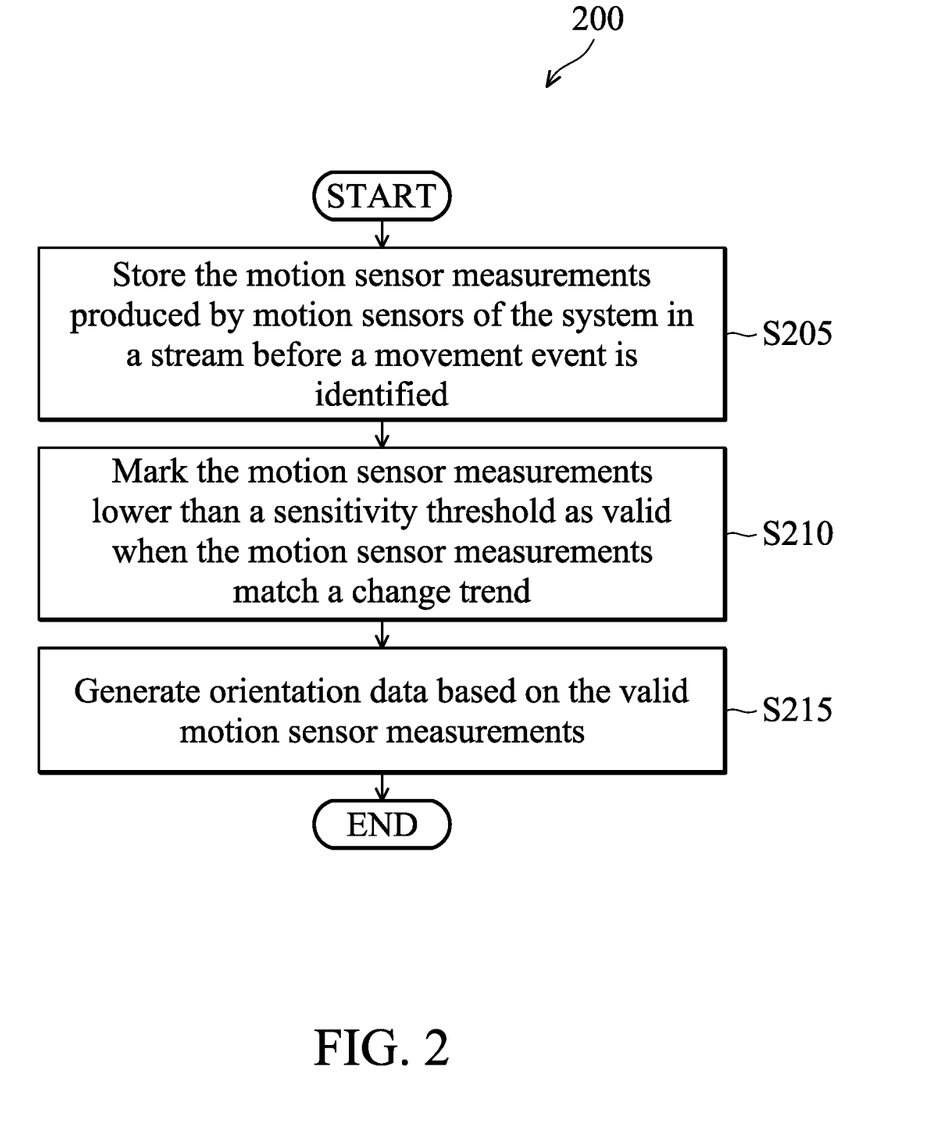
FIG. 2 is a flow chart illustrating a control method for controlling a system to play spatial audio according to an embodiment of the disclosure.

FIG. 2 is a flow chart illustrating a control method 200 for controlling a system to play spatial audio according to an embodiment of the disclosure. The control method 200 can be implemented in a wearable electronic device shown in FIG. 1, and a system, for example, the system architecture 1000 shown in FIG. 10. The architecture includes a wireless transceiver (e.g., a Bluetooth chipset) that allows sensor data and other data to be communicated between the wearable electronic device 110 and the source device 120.

In step S205, a processor of the system stores the motion sensor measurements produced by motion sensors of the system in a stream before a movement event is identified, wherein the processor is embedded with a buffer. Specifically, the system stores the motion sensor measurements produced over a time window before the movement event is identified in the buffer of the system, and each of the motion sensor measurements has a time stamp corresponding to the time at which the motion sensor measurement is produced. The motion sensor measurements can include acceleration measurement data generated by an accelerometer and rotation measurement data generated by a gyroscope. The acceleration measurement data can reflect the intensity and direction of movement of the system when the system is moving, and the rotation measurement data can reflect the change of the attitude angle of the system when the system is moving. In some embodiments, the motion sensor measurements can be sequentially stored in the memory or the buffer of the system in chronological order. In another embodiment, first-in-first-out (FIFO) data queue management structures can be used to manage the reading and writing of the motion sensor measurements. The motion sensor measurements are sequentially written into and read from the memory or the buffer.

In step S210, the processor marks the motion sensor measurements lower than a sensitivity threshold as valid when the motion sensor measurements match a change trend, wherein the change trend is divided into a trembling phase for the motion sensor measurements not matching a consistent change trend and an acceleration phase for the motion sensor measurements matching the consistent change trend.

In step S215, the processor generates orientation data based on the valid motion sensor measurements. Specifically, the processor estimates the orientation data of the system, wherein each of the orientation data has a time stamp corresponding to the time at which the orientation data are estimated. Then, the processor withholds the value of the orientation data until the movement event is identified. The processor consecutively updates the value of the orientation data based on the valid motion sensor measurements, wherein the valid motion sensor measurements have earlier time stamps than time stamps of the estimated orientation data. In one embodiment, the difference between the time stamps of the valid motion sensor measurements and the time stamps of the motion sensor measurements is corresponding to a time span of the time window. In some embodiments, the processor performs an integration operation of an extended Kalman filter on the valid motion sensor measurements with the earlier time stamps to estimate the orientation data with current time stamps.

In another embodiment, the processor of the system may identify a turning event in the change trend. The processor of the system marks the motion sensor measurements corresponding to the acceleration phase as valid and marks the motion sensor measurements corresponding to the trembling phase as invalid, wherein the invalid motion sensor measurements before the movement event are set to zero.

Specifically, the processor of the system determines that the motion sensor measurements belong to the acceleration phase for the motion sensor measurements matching the consistent change trend. Moreover, the system determines the motion sensor measurements matching the consistent change trend if a majority of comparison results between each pair of consecutive motion sensor measurements over the time window is consistent.

The processor of the system determines that the motion sensor measurements belong to the trembling phase for the motion sensor measurements not matching the consistent change trend. Moreover, the system determines the motion sensor measurements not matching the consistent change trend if the comparison results between each pair of consecutive motion sensor measurements over the time window are not consistent, such as: 1. the comparison results are randomly positive or negative; 2. the number of positive comparison results is not apparently larger than the number of negative comparison results; or the number of negative comparison results is not apparently larger than the number of positive comparison results.

In another embodiment, the processor of the system may further be stored over a prolonged time window, wherein the prolonged time window is at least 2 times larger than the time window. When a value of the motion sensor measurements over the prolonged time window exceeds the sensitivity threshold, the processor identifies that the movement event has occurred.

Figure 3:
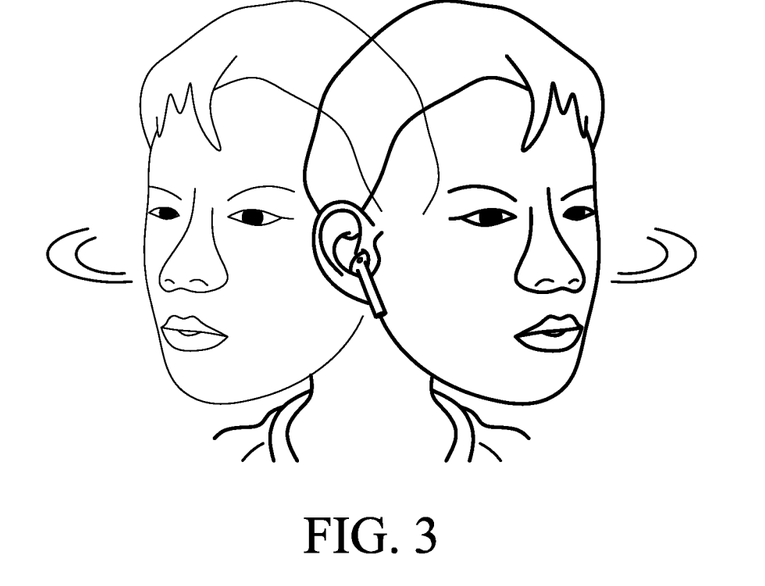
FIG. 3 is a schematic diagram of a user turning his/her head according to embodiments of the disclosure.
Figure 4:
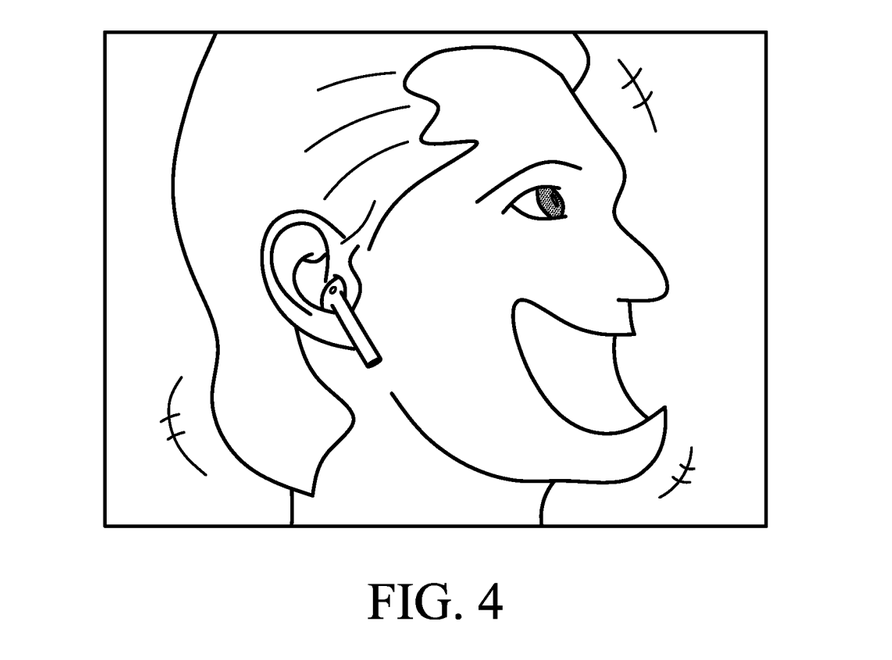
FIG. 4 is a schematic diagram showing a user's head vibrating due to laughter according to embodiments of the disclosure.

After the process in FIG. 2, the system can filter out the motion sensor measurements that do or do not meet the consistent change trend. For example, an explicit head turning when the user hears someone calling (as shown in FIG. 3), the processor can identify the motion sensor measurements matching the consistent change trend. Accordingly the processor can perform an integration operation of an extended Kalman filter based on the valid motion sensor measurements which are lower than the sensitivity threshold and motion sensor measurements which are produced after the movement event and exceed the sensitivity threshold. On the other hand, when the head does not show explicit turning, such as when the head vibrates due to laughing (as shown in FIG. 4), the processor can filter out the motion sensor measurements that do not meet the consistent change trend, and accordingly the invalid motion sensor measurements before the movement event can be set to zero.

How to determine whether the motion sensor measurements belong to the acceleration phase for the motion sensor measurements matching the consistent change trend will be explained in detail below.

Figure 5:
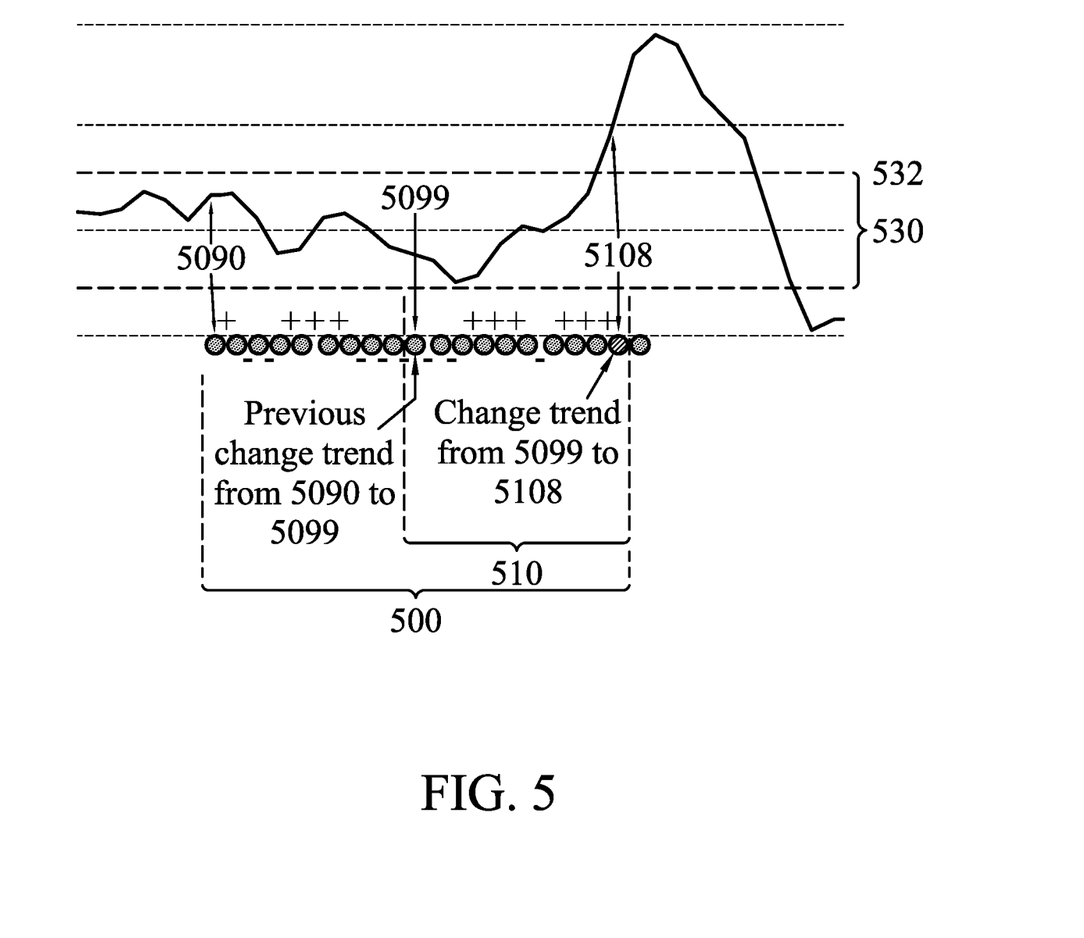
FIG. 5 shows a distribution curve of the rotation measurement data over time in the motion sensor measurements of the system according to an embodiment of the disclosure.

FIG. 5 shows a distribution curve of the rotation measurement data over time in the motion sensor measurements of the system according to an embodiment of the disclosure. Time increases from left to right in FIG. 5.

It should be noted that the system can store the motion sensor measurements over a time window and a prolonged time window before the movement event is identified in the buffer, wherein each of the motion sensor measurements has a time stamp corresponding to the time at which the motion sensor measurement is produced and the time window may include multiple consecutive time stamps. In some embodiment, the prolonged time window is at least 2 times larger than the time window.

In this embodiment, it is assumed that the system stores the motion sensor measurements over a time window 510 and a prolonged time window 500 in the buffer, wherein the number of the multiple consecutive time stamps in the time window 510 is 10, and the number of the multiple consecutive time stamps in the prolonged time window 500 is 19.

In addition, the change trend of the motion sensor measurements within the time window 510 is stored at the time stamp 5108, and a previous change trend of previous motion sensor measurements from the time stamp 5090 to the time stamp 5099 is stored at the first time stamp 5099 in the time window 510. Therefore, the change trend stored from the time stamp 5099 to the time stamp 5108 in the time window 510 can include the change trends from the time stamp 5090 to the time stamp 5108 in the prolonged time window 500. In other words, the processer of the system may identify whether the movement event has occurred according to the change trends from the time stamp 5090 to the time stamp 5108 stored in the buffer.

As shown in FIG. 5, the system may first determine whether a horizontal axis rotation value of a rotation measurement data in the motion sensor measurements in the time window 510 over the prolonged time window exceeds a sensitivity threshold 532, wherein the rotation measurement data can be obtained from the gyroscope measurement in the motion sensor of the system, and the horizontal axis rotation value can be a movement angular velocity along a horizontal axis in the rotation measurement data.

When the horizontal axis rotation value exceeds the sensitivity threshold 532 at the time stamp 5108, the system determines whether the change trend of the motion sensor measurements stored over the time window 510 is consistent. In other words, the system determines that a majority of comparison results between each pair of consecutive motion sensor measurements over the time window 510 is consistent. Accordingly, the processor of the system determines that the motion sensor measurements belong to the acceleration phase. On the other hand, the system determines the motion sensor measurements not matching the consistent change trend if the comparison results between each pair of consecutive motion sensor measurements over the time window 510 are not consistent. Accordingly, the processor of the system determines that the motion sensor measurements belong to the trembling phase for the motion sensor measurements not matching the consistent change trend.

For example, the motion sensor measurement corresponding to a current time stamp is compared with the motion sensor measurement corresponding to a previous time stamp of the current time stamp to obtain the comparison result of a pair of consecutive motion sensor measurements of two consecutive time stamps, the current time stamp and the previous time stamp. When the motion sensor measurement corresponding to a certain time stamp is greater than the motion sensor measurements corresponding to the previous time stamp of the certain time stamp, the comparison result of the motion sensor measurements at the two consecutive time stamps is regarded as positive and is represented by "+". When the motion sensor measurements corresponding to a certain time stamp is smaller than the motion sensor measurements corresponding to the previous time stamp of the certain time stamp, the comparison result of the pair of consecutive motion sensor measurements at two consecutive time stamps is regarded as a downward trend and is represented by "—".

In the time window 510 of FIG. 5, the number of positive comparison results represented by "+" is 6, and the number of negative comparison results represented by "—" is 3. In addition, the comparison result of the motion sensor measurements from the time stamp 5090 to the time stamp 5099 are also stored in the buffer at the time stamp 5099. The system may obtain the number of positive comparison represented by "+" is 4 and the number of negative comparison results represented by "—" is 5 from the time stamp 5090 to the time stamp 5099.

Since the number of positive comparison results is greater than the number of negative comparison, so the change trend of the motion sensor measurements stored over the time window 510 is consistent. When the change trend of the motion sensor measurements over the time window 510 is consistent, the system determines that the motion sensor measurements belong to the acceleration phase for the motion sensor measurements matching the consistent change trend.

When the horizontal axis rotation value does not exceed the sensitivity threshold 532, the system identifies that the movement event does not occur. For example, since the horizontal axis rotation value does not exceed the sensitivity threshold 532 between the time stamp 5090 and the time stamp 5107, the system may identifies that the movement event does not occur during the time stamp 5090 to the time stamp 5107.

In some embodiments, a movement interval 530 can be set to two degrees-per-second (2 dps). Taking the size of the buffer in the system as 10 as an example, the buffer can store the rotation measurement data in 10 consecutive motion sensor measurements corresponding to 10 consecutive time stamps 5099 to 5108. Since the rotation measurement data at the time stamp 5108 exceeds the sensitivity threshold 532, the system identifies whether the movement event has occurred based on the rotation measurement data of 10 consecutive time stamps from the time stamps 5099 to 5108 in the buffer.

Figure 6:
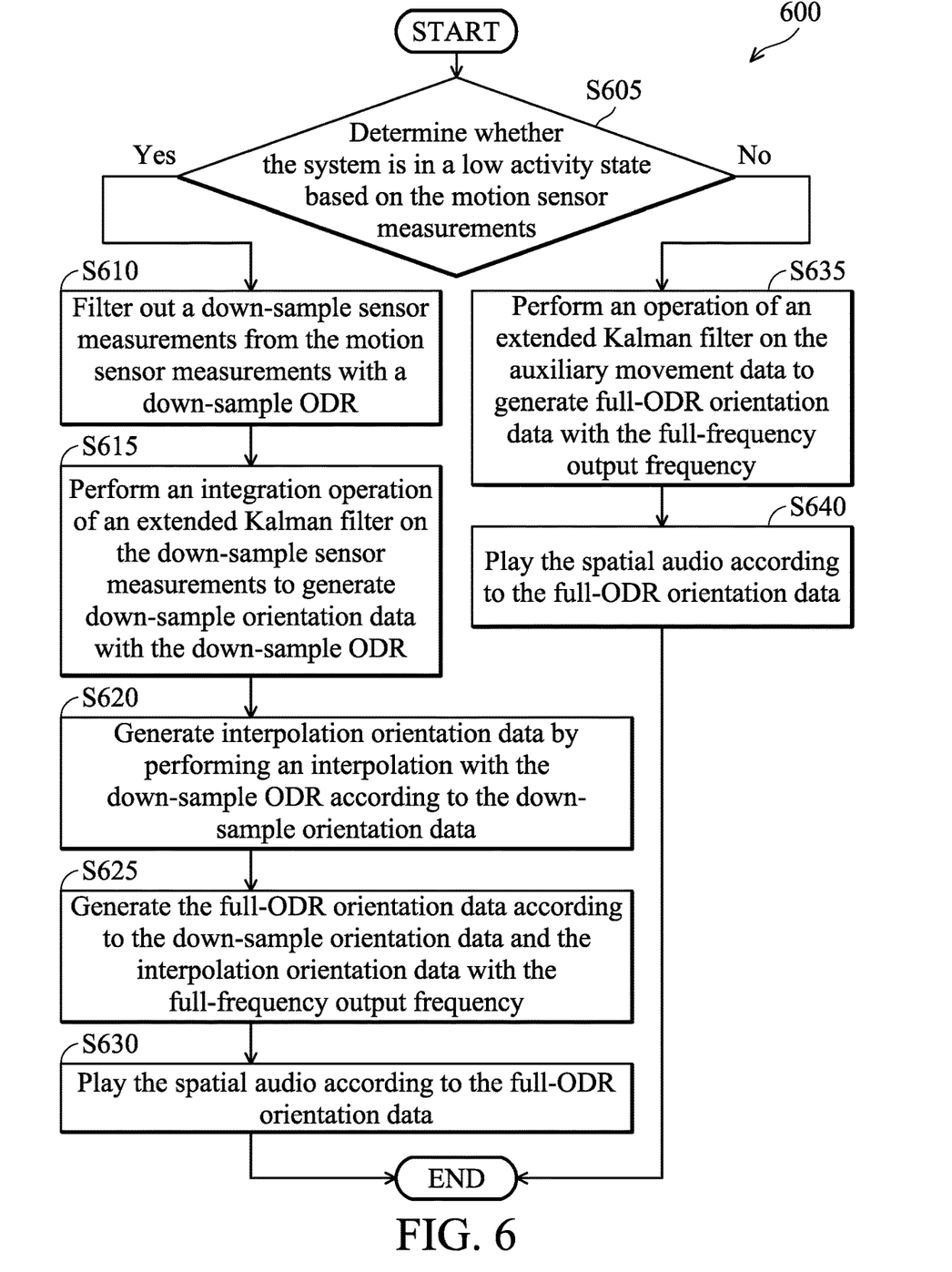
FIG. 6 is a flow chart illustrating a control method for controlling a system to play spatial audio according to an embodiment of the disclosure.

FIG. 6 is a flow chart illustrating a control method 600 for controlling a system to play spatial audio according to an embodiment of the disclosure. The control method 600 can be implemented in the wearable electronic device shown in FIG. 1, and a system, for example, the system architecture 1000 shown in FIG. 10.

In step S605, the system determines whether the system is in a low activity state based on the motion sensor measurements. The low activity state may be predefined according to the electronic device. When the system is in a state of low activity, the system works normally and plays spatial audio, and the system does not physically move above a preset range. For example, when a user wears a system and watches a movie while lying down or sitting on the ground, the user generally remains relatively still, and the head usually only moves unconsciously and/or slightly with a small range of motion. In other words, when the system worn on the head does not move significantly above a preset range, the system can be considered that the system is in a low activity state.

When the system is in the low activity state ("Yes" in step S605), in step S610, the system filters out down-sample sensor measurements from the motion sensor measurements with a down-sample output data rate (ODR), and stores the down-sample sensor measurements into the buffer. The fact that the system is in a low activity state means that the spatial position of the system has not changed within a corresponding time period or has not changed significantly above a preset range. The system may only use part of the motion sensor measurements (i.e., the down-sample sensor measurements) but not all the motion sensor measurements in the time window, so as to obtain the orientation information of the system at some time stamps in the time window.

In step S615, the system performs an integration operation with an extended Kalman filter on the down-sample sensor measurements to generate down-sample orientation data with the down-sample ODR.

In step S620, the system generates interpolation orientation data by performing an interpolation with the down-sample ODR according to the down-sample orientation data.

In step S625, the system generates the full-ODR orientation data according to the down-sample orientation data and the interpolation orientation data with the full-frequency output frequency, wherein the full-frequency output frequency is an integer multiple of the down-sample ODR.

In step S630, the system plays the spatial audio according to the full-ODR orientation data, wherein the full-ODR orientation data is a set of quaternion values or a set of Euler angles.

Back to step S610, when the system is not in the low activity state ("No" in step S605), in step S635, the system performs an operation with the extended Kalman filter on the auxiliary movement data to generate full-ODR orientation data with the full-frequency output frequency, wherein the motion sensor measurements are stored in the buffer at the full frequency output frequency.

In step S640, the system plays the spatial audio according to the full-ODR orientation data, wherein the full-ODR orientation data is a set of quaternion values or a set of Euler angles.

Based on steps S610-S630, since the spatial position of the system has not changed significantly or has not changed above the preset range within the corresponding time period, the full-ODR orientation data obtained by combining the down-sample sensor measurements with the approximate calculation may not significantly deviate from the real target orientation of the spatial audio, and the orientation error is still within the allowed small range. Therefore, when the user listens to the spatial audio played according to the full-ODR orientation data, the user may not notice the difference obviously, so that the spatial audio played by the system can meet the experience needs of the user. On the other hand, the calculation amount on the motion sensor measurements can be reduced and approximated by the approximate calculations such as the interpolation processing. Since the calculation amount of approximate calculations such as the interpolation processing is small, when the calculation of the motion sensor measurements is replaced by the approximate calculations with a small calculation amount, the calculation burden and power consumption of the processor in the system can be reduced when the activity is low, thereby increasing the battery life of the system.

Based on steps S635 and S640, the fact that the system is not in the low activity state means that the user has a relatively large position change. The system needs to calculate all the motion sensor measurements in the corresponding time period to obtain the orientation information of the system at all time points in the time period, so as to improve the calculation accuracy of the orientation of the spatial audio. The played spatial audio can accurately follow the movement of the user and be positioned in a suitable position, and the system enables the user to obtain a more accurate and immersive listening effect.

Figure 7:
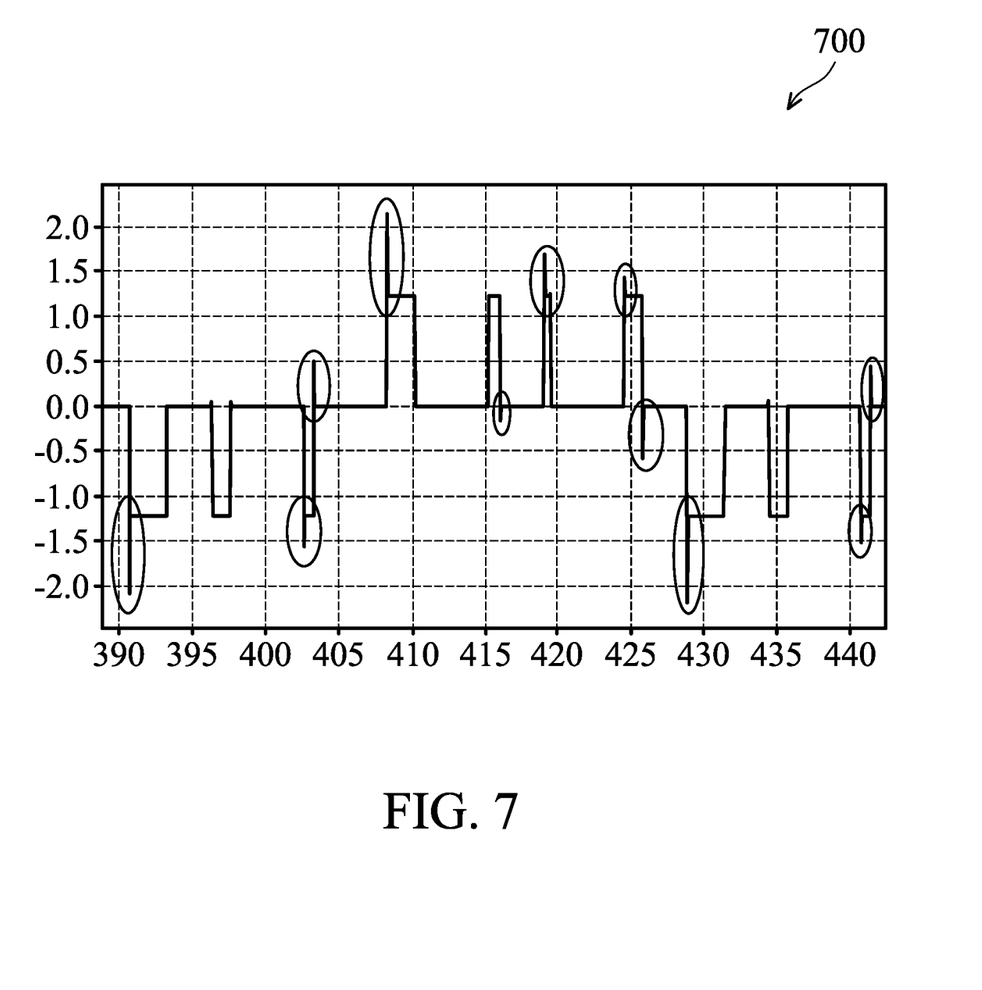
FIG. 7 shows a waveform distribution diagram of the rotation measurement data of the motion sensor measurements of the system as a function of time according to an embodiment of the disclosure.

FIG. 7 shows a waveform distribution diagram 700 of the rotation measurement data of the motion sensor measurements of the system as a function of time according to an embodiment of the disclosure. The horizontal axis represents time (in seconds), while the vertical axis represents angular rate (in degrees per second). In this embodiment, the movement interval is from −2 radian per second to 2 radian per second. As shown in FIG. 7, there are many rapidly increasing values marked by ellipses and located outside the movement interval. These rapidly increasing values present the characteristics of rapid fluctuations in a short period of time and belong to noise distortion values corresponding to noise interference. These rapidly increasing values can be removed through a median filter, which replace the value of each motion sensor measurements by a median value of neighboring motion sensor measurements over a moving time window, such as the median value of a current motion sensor measurement, its two left neighboring motion sensor measurements, and its two right neighboring motion sensor measurements.

In some embodiments, the motion sensors may be attached to a headset worn by an user, and the headset is a binaural audio device including two earpieces, each earpiece has an auxiliary sensor and a micro-processor of generating the orientation data, and each micro-processor is capable of performing the operations shown in FIGS. 2 to 7. In response to one of the two earpieces switching from an operation mode to a standby mode, the other earpiece switches from the standby mode to the operation mode. In other words, among the two earpieces of the binaural audio device, the micro-processor of at least one earpiece is always in the operation mode at different times, which can ensure the continuous execution of the control method in FIGS. 2 to 7, and ensure the response sensitivity of the system to the change of the user's position.

Specifically, when the micro-processor of one earpiece switches from the operation mode to the standby mode, the micro-processor of the one earpiece transmits the orientation data corresponding to a switch time stamp to the micro-processor of the other earpiece. In this way, the micro-processor of the other earpiece can continue to generate the orientation data based on the transmitted orientation data and the motion sensor measurements from the motion sensors of the other earpiece, and then control the system. Therefore, the micro-processors of the two earpieces switches between the standby mode and the operation mode without affecting the playback of the spatial audio, ensuring the spatial audio effect required by the user.

Figure 8:
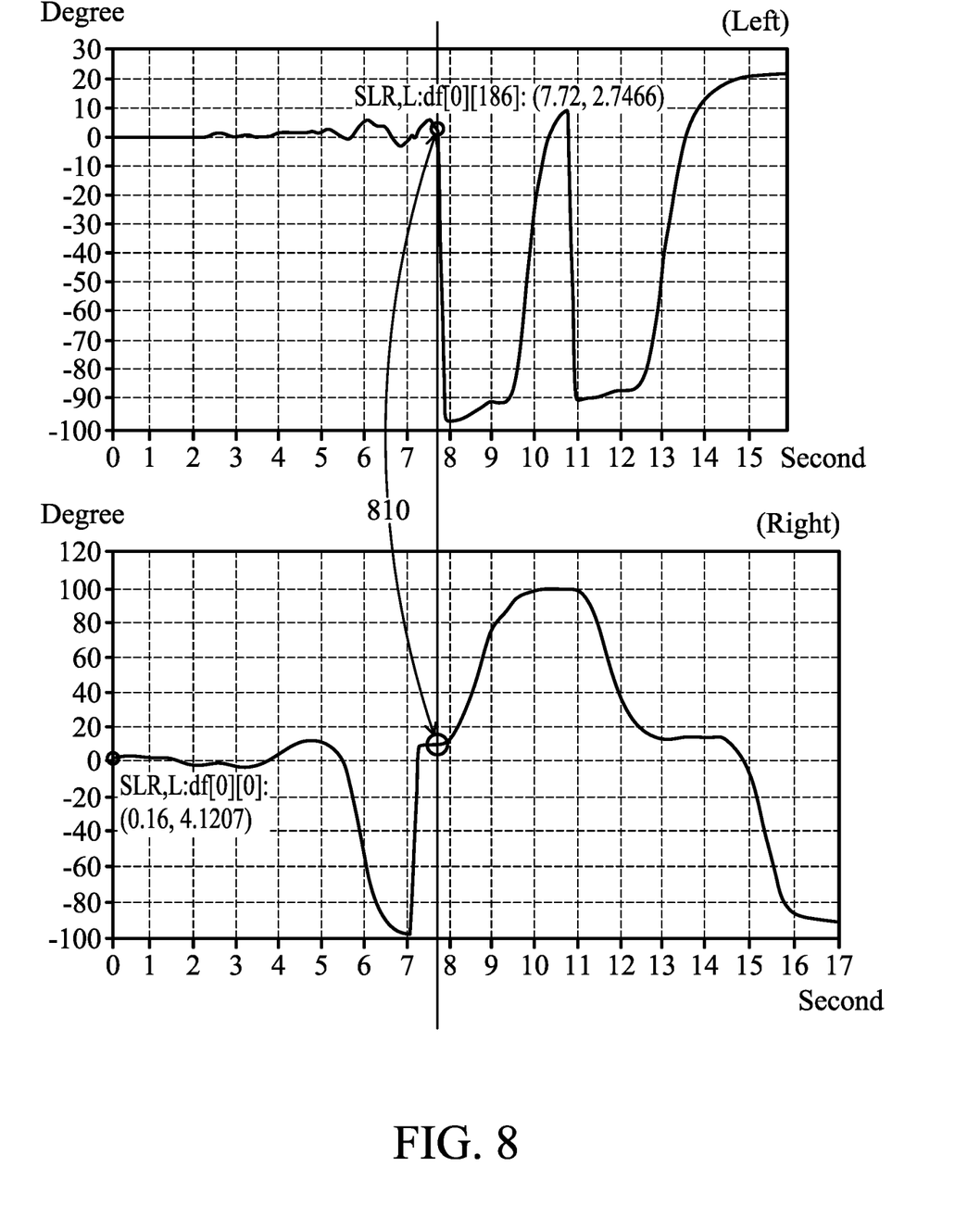
FIG. 8 shows an exemplary diagram of switching spatial audio between the left earpiece and the right earpiece in the system according to embodiments of the disclosure.

FIG. 8 shows an exemplary diagram of switching spatial audio between the left earpiece and the right earpiece in the system according to embodiments of the disclosure. The upper diagram in FIG. 8 is a schematic diagram of the angle of the left earpiece changing with time. The lower diagram in FIG. 8 is a schematic diagram of the angle of the right earpiece changing with time. As shown in FIG. 8, the operation of playing spatial audio is mainly controlled by the left earpiece before the time point 810. The left earpiece switches modes with the right earphone at the time point 810, and the operation of playing spatial audio is controlled by the right earpiece after the time point 810.

In one embodiment, the system can set a reset mechanism so that when the system is determined not to move or to vibrate with a small amplitude for a long time, the full-ODR orientation data can be regenerated, and the spatial audio can be reset according to the regenerated full-ODR orientation data.

TABLE 1

| Trial | Spatial audio |
|---|---|
| Look forward for 7~9 seconds | Reset |
| Keep nodding for 7~9 seconds | Reset |
| Keep shaking (~10 deg) for 7~9 seconds | Not reset |

As shown in TABLE 1, when the user wearing the system looks forward steadily for 7-9 seconds or keeps nodding for 7-9 seconds, the system can regenerate the full-ODR orientation data and reset the spatial audio. However, when the user wearing the system keeps shaking his/her head in a small range for 7-9 seconds, the system cannot reset the spatial audio.

Figure 9:
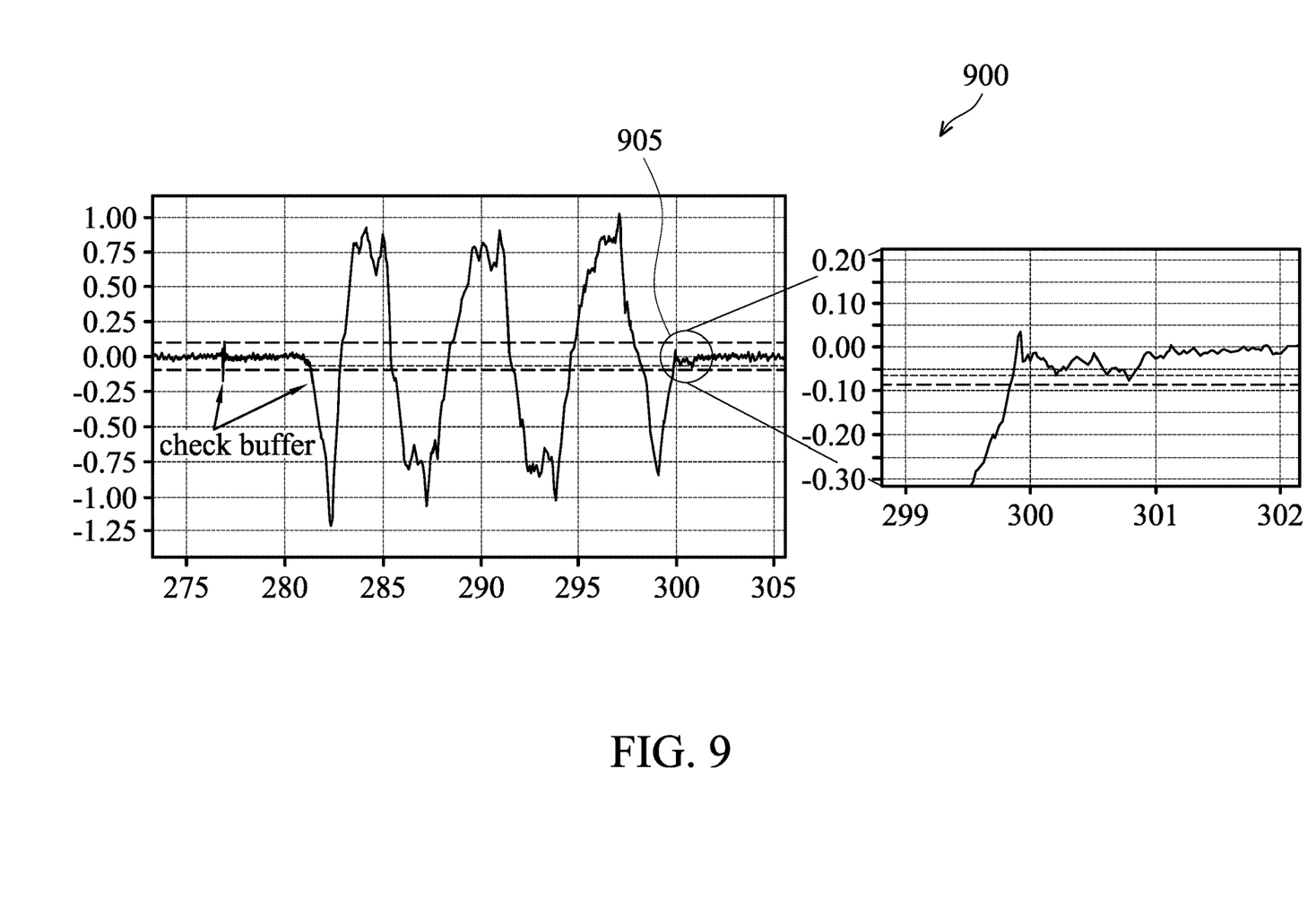
FIG. 9 is a schematic diagram of the trembling proof of the system according to an embodiment of the disclosure.

FIG. 9 is a schematic diagram 900 of the trembling proof of the system according to an embodiment of the disclosure. As shown in FIG. 9, when the system determines that the rotation measurement data exceeds a movement interval, the system checks the buffer to identify whether the motion sensor measurements match a consistent change trend and marks the motion sensor measurements lower than a sensitivity threshold as valid when the motion sensor measurements match a change trend. After the motion sensor measurements falls within the movement interval as shown in the interval 905 and stays in the movement interval for a period of time, the system can resume the reset mechanism as described in last paragraph. For example, when the system identifies that a movement event does not occurred during the interval as shown in 905, the system can generate new full-ODR orientation data and determine whether to initiate the reset mechanism as shown in TABLE 1 based on the full-ODR orientation data.

As mentioned above, the control method and system using the same provided in the present disclosure does not need to continuously update the spatial audio, so the control method and system using the same can achieve the effect of power saving of the system, and can meet the user's entertainment requirements for a long time.

Figure 10:
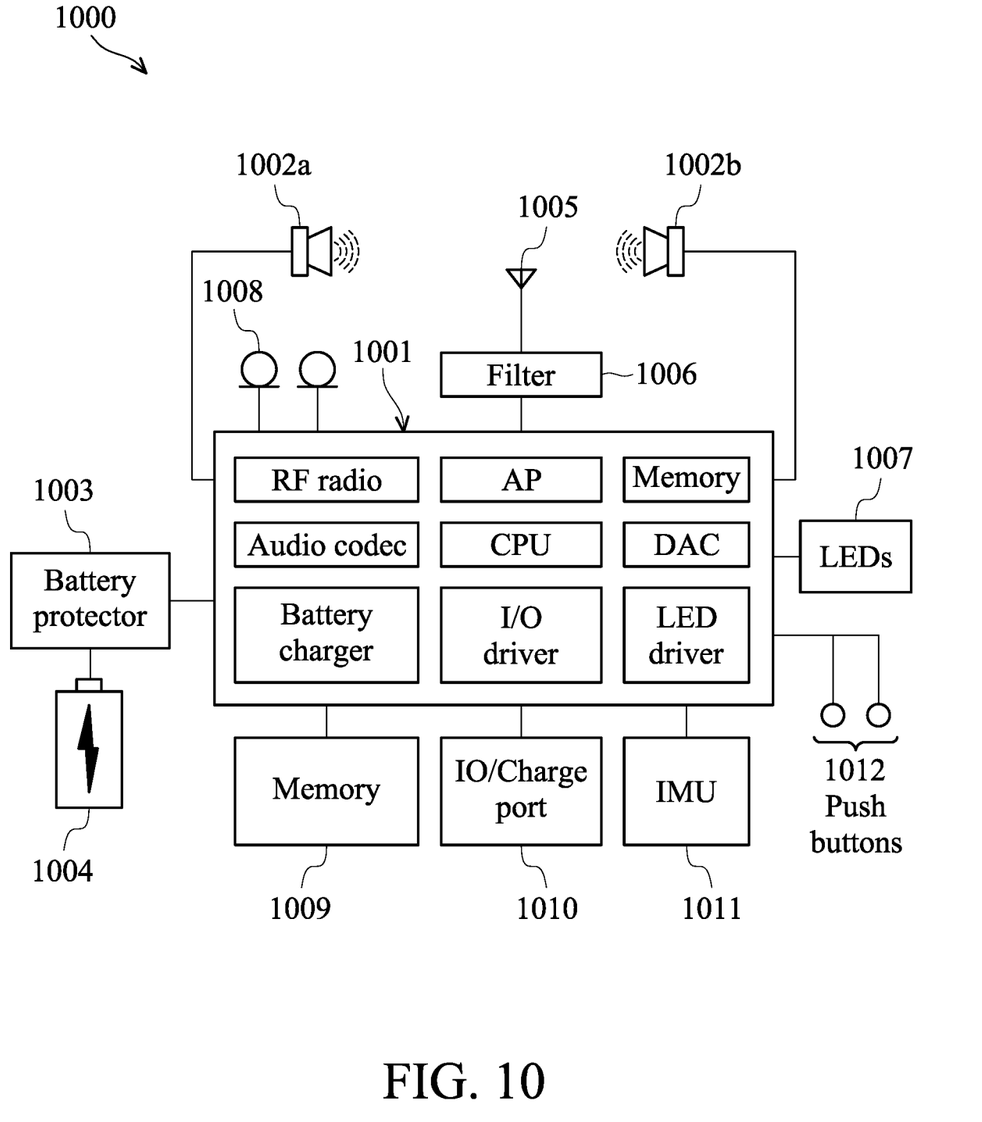
FIG. 10 is a conceptual block diagram of system software/hardware architecture implementing the features and operations described in reference to FIGS. 1-9.

FIG. 10 is a conceptual block diagram of system software/hardware architecture 1010 implementing the features and operations described in reference to FIGS. 1-9. In an embodiment, the architecture 1000 can includes a system-on-chip (SoC) 1001, stereo loudspeakers 1002a, 1002b (e.g., earpieces, earbuds, headphones, ear phones), a battery protector 1003, a rechargeable battery 1004, an antenna 1005, a filter 1006, LEDs 1007, microphones 1008, a memory 1009 (e.g., a volatile memory, a non-volatile memory, a cache memory, an operation buffer), a I/O and charge port 1010, a IMU 1011 and pushbuttons 1012 for turning the system on and off, adjusting volume, muting, etc. The IMU 1011 was previously described in reference to FIGS. 1-9 and includes one or more motion sensors, for example, a 3-axis MEMS gyro and a 3-axis MEMS accelerometer.

The SoC 1001 further includes various modules, such as a radio frequency (RF) radio (wireless transceiver) for wireless bi-directional communication with other devices, such as a source device 120, as described in reference to FIGS. 1-9. The SoC 1001 further includes an application processor (AP) for running specific applications, memory (e.g., a flash memory, a volatile memory, a non-volatile memory, a cache memory, an operation buffer), central processing unit (CPU) for managing various functions of the systems, audio codec for encoding/decoding audio, battery charger for charging/recharging the rechargeable battery 1004, a I/O driver for driving I/O and charge port (e.g., a micro USB port), a digital to analog converter (DAC) converting digital audio into analog audio and a LED driver for driving the LEDs 1007. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any disclosures or of what may be claimed, but rather as descriptions of features specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system, comprising:
    motion sensors, producing motion sensor measurements in a stream; and
    a processor, coupled to the motion sensors and configured to execute the following tasks:
        storing the motion sensor measurements produced before a movement event is identified;
        marking the motion sensor measurements lower than a sensitivity threshold as valid when the motion sensor measurements match a change trend; and
        generating orientation data based on the valid motion sensor measurements.

2. The system as claimed in claim 1, wherein the processor is embedded with a buffer, and further executes the following tasks:
    storing the motion sensor measurements produced over a time window before the movement event is identified in the buffer;
    identifying a turning event in the change trend, wherein the change trend is classified as one of a trembling phase for the motion sensor measurements not matching a consistent change trend and an acceleration phase for the motion sensor measurements matching the consistent change trend; and
    marking the motion sensor measurements corresponding to the acceleration phase as valid and the motion sensor measurements corresponding to the trembling phase as invalid;
    wherein the invalid motion sensor measurements before the movement event are set to zero.

3. The system as claimed in claim 2, wherein the processor further executes the following tasks:
    determining that the motion sensor measurements belong to the acceleration phase for the motion sensor measurements matching the consistent change trend; and
    determining that the motion sensor measurements belong to the trembling phase for the motion sensor measurements not matching the consistent change trend.

4. The system as claimed in claim 2, wherein the motion sensor measurements produced before the movement event is stored over a prolonged time window, which is at least 2 times larger than the time window, and the processor is configured to identify the movement event when a value of the motion sensor measurements over the prolonged time window exceeds the sensitivity threshold.

5. The system as claimed in claim 1, wherein each of the motion sensor measurements has a time stamp corresponding to the time at which the motion sensor measurement is produced, and wherein the step of generating the orientation data further comprises:
    estimating the orientation data of the system, wherein each of the orientation data has a time stamp corresponding to the time at which the orientation data are estimated;
    withholding a value of the orientation data until the movement event is identified; and
    consecutively updating the value of the orientation data based on the valid motion sensor measurements, wherein the valid motion sensor measurements have earlier time stamps than time stamps of the estimated orientation data.

6. The system as claimed in claim 5, wherein a difference between the time stamps of the valid motion sensor measurements and the time stamps of the motion sensor measurements corresponding to a time span of a time window.

7. The system as claimed in claim 5, wherein the step of consecutively updating the value of the orientation data based on the valid motion sensor measurements further comprises:
    performing an integration operation with an extended Kalman filter on the valid motion sensor measurements with the earlier time stamps to estimate the orientation data with current time stamps.

8. The system as claimed in claim 1, wherein the motion sensor measurements comprise a horizontal axis rotation value of rotation measurement data in the motion sensor measurements.

9. The system as claimed in claim 5, wherein the processor further executes the following tasks:
    filtering out down-sample sensor measurements from the motion sensor measurements with a down-sample output data rate (ODR) in response to a low activity state identified based on the motion sensor measurements;
    performing an integration operation with an extended Kalman filter on the down-sample sensor measurements to generate down-sample orientation data with the down-sample ODR;
    generating interpolation orientation data by performing an interpolation with the down-sample ODR according to the down-sample orientation data;
    generating full-ODR orientation data according to the down-sample orientation data and the interpolation orientation data; and
    playing spatial audio according to the full-ODR orientation data.

10. The system as claimed in claim 1, wherein the processor further executes the following tasks:
    performing an operation with an extended Kalman filter on the motion sensor measurements to generate full-ODR orientation data in response to the system not being in a low activity state; and
    playing spatial audio according to the full-ODR orientation data.

11. The system as claimed in claim 1, wherein the motion sensors are attached to a headset worn by an user, and the headset is a binaural audio device including two earpieces, each earpiece has an auxiliary sensor and a micro-processor of generating the orientation data, and each micro-processor further executes the following tasks:
    in response to one of the two earpieces switching from an operation mode to a standby mode, the other earpiece switches from the standby mode to the operation mode.

12. The system as claimed in claim 11, wherein the one of the two earpieces transmits the orientation data corresponding to a switch time stamp to the other earpiece, and switches from the operation mode to the standby mode, while the other one of the two earpieces continues to generate the orientation data based on the transmitted orientation data and the motion sensor measurements from the motion sensors of the other one of the two earpieces.

13. The system as claimed in claim 11, wherein the motion sensor measurements match a consistent change trend if a majority of comparison results between each pair of consecutive motion sensor measurements over a time window is consistent.

14. A control method, used in a system and executed by a processor of the system, comprising:
   storing motion sensor measurements produced before a movement event is identified, wherein the motion sensor measurements is produced by motion sensors;
   marking the motion sensor measurements lower than a sensitivity threshold as valid when the motion sensor measurements match a change trend; and
   generating orientation data based on the valid motion sensor measurements.

15. The control method as claimed in claim 14, wherein the processor is embedded with a buffer, and the method further comprises:
   storing the motion sensor measurements produced over a time window before the movement event is identified in the buffer;
   identifying a turning event in the change trend, wherein the change trend is classified as one of a trembling phase for the motion sensor measurements not matching a consistent change trend and an acceleration phase for the motion sensor measurements matching the consistent change trend; and
   marking the motion sensor measurements corresponding to the acceleration phase as valid and the motion sensor measurements corresponding to the trembling phase as invalid;
   wherein the invalid motion sensor measurements before the movement event are set to zero.

16. The control method as claimed in claim 15, further comprising:
   determining that the motion sensor measurements belong to the acceleration phase for the motion sensor measurements matching the consistent change trend; and
   determining that the motion sensor measurements belong to the trembling phase for the motion sensor measurements not matching the consistent change trend.

17. The control method as claimed in claim 15, wherein the motion sensor measurements produced before the movement event is stored over a prolonged time window, which is at least 2 times larger than the time window, and the processor is configured to identify the movement event when a value of the motion sensor measurements over the prolonged time window exceeds the sensitivity threshold.

18. The control method as claimed in claim 14, wherein each of the motion sensor measurements has a time stamp corresponding to the time at which the motion sensor measurement is produced, and wherein the step of generating the orientation data further comprises:
   estimating the orientation data of the system, wherein each of the orientation data has a time stamp corresponding to the time at which the orientation data are estimated;
   withholding a value of the orientation data until the movement event is identified; and
   consecutively updating the value of the orientation data based on the valid motion sensor measurements, wherein the valid motion sensor measurements have earlier time stamps than time stamps of the estimated orientation data.

19. The control method as claimed in claim 18, wherein a difference between the time stamps of the valid motion sensor measurements and the time stamps of the motion sensor measurements corresponds to a time span of a time window.

20. The control method as claimed in claim 18, wherein the step of consecutively updating the value of the orientation data based on the valid motion sensor measurements further comprises:
   performing an integration operation with an extended Kalman filter on the valid motion sensor measurements with the earlier time stamps to estimate the orientation data with current time stamps.

21. The control method as claimed in claim 14, wherein the motion sensor measurements comprise a horizontal axis rotation value of rotation measurement data in the motion sensor measurements.

22. The control method as claimed in claim 18, wherein the control method further comprises:
   filtering out down-sample sensor measurements from the motion sensor measurements with a down-sample output data rate (ODR) in response to a low activity state identified based on the motion sensor measurements;
   performing an integration operation with an extended Kalman filter on the down-sample sensor measurements to generate down-sample orientation data with the down-sample ODR;
   generating interpolation orientation data by performing an interpolation with the down-sample ODR according to the down-sample orientation data;
   generating full-ODR orientation data according to the down-sample orientation data and the interpolation orientation data; and
   playing spatial audio according to the full-ODR orientation data.

23. The control method as claimed in claim 14, further comprising:
   performing an operation with an extended Kalman filter on the motion sensor measurements to generate full-ODR orientation data in response to the system not being in a low activity state; and
   playing spatial audio according to the full-ODR orientation data.

24. The control method as claimed in claim 14, wherein the motion sensors are attached to a headset worn by an user, and the headset is a binaural audio device including two earpieces, each earpiece has an auxiliary sensor and a micro-processor of generating the orientation data, and each micro-processor further executes the following tasks:
   in response to one of the two earpieces switching from an operation mode to a standby mode, the other earpiece switches from the standby mode to the operation mode.

25. The control method as claimed in claim 24, wherein the one of the two earpieces transmits the orientation data corresponding to a switch time stamp to the other earpiece, and switches from the operation mode to the standby mode, while the other one of the two earpieces continues to generate the orientation data based on the transmitted orientation data and the motion sensor measurements from the motion sensors of the other one of the two earpieces.

26. The control method as claimed in claim 24, wherein the motion sensor measurements matching a consistent change trend if a majority of comparison results between each pair of consecutive motion sensor measurements over a time window is consistent.

* * * * *